US012145203B2

(12) United States Patent
Knight et al.

(10) Patent No.: US 12,145,203 B2
(45) Date of Patent: Nov. 19, 2024

(54) ROTARY TOOL

(71) Applicant: TECHTRONIC CORDLESS GP, Anderson, SC (US)

(72) Inventors: Tyler H. Knight, Greenville, SC (US); Brian D. Mertel, Simpsonville, SC (US); M. Grayson Jacoway, Mauldin, SC (US); Edward A. Pomeroy, Piedmont, SC (US)

(73) Assignee: Techtronic Cordless GP, Anderson, SC (US)

( * ) Notice: Subject to any disclaimer, the term of this patent is extended or adjusted under 35 U.S.C. 154(b) by 105 days.

(21) Appl. No.: 17/149,293

(22) Filed: Jan. 14, 2021

(65) Prior Publication Data
US 2021/0220925 A1 Jul. 22, 2021

Related U.S. Application Data

(60) Provisional application No. 62/962,444, filed on Jan. 17, 2020.

(51) Int. Cl.
*B23B 31/20* (2006.01)
*B25F 3/00* (2006.01)
*B25F 5/02* (2006.01)
*F21V 33/00* (2006.01)
*F21Y 115/10* (2016.01)

(52) U.S. Cl.
CPC ............... *B23B 31/20* (2013.01); *B25F 3/00* (2013.01); *B25F 5/02* (2013.01); *F21V 33/0084* (2013.01); *F21Y 2115/10* (2016.08)

(58) Field of Classification Search
CPC .................................. B25F 5/02; B25F 5/026
See application file for complete search history.

(56) References Cited

U.S. PATENT DOCUMENTS

| 1,874,888 | A |   | 8/1932 | Burrell |
| 4,989,323 | A | * | 2/1991 | Casper .................... F16D 1/116 |
|           |   |   |        | 408/127 |
| 5,009,539 | A |   | 4/1991 | Mullenberg |

(Continued)

FOREIGN PATENT DOCUMENTS

| DE | 102018203519 A1 | 9/2019 |
| EP | 0765706 B1 | 7/1999 |

(Continued)

OTHER PUBLICATIONS

Extended European Search Report for Application No. 21151921.0 dated Jun. 29, 2021 (5 pages).

*Primary Examiner* — Daniel Jeremy Leeds
(74) *Attorney, Agent, or Firm* — Michael Best & Friedrich LLP

(57) ABSTRACT

A rotary tool includes a housing, a drive shaft positioned within the housing, and a bit holder. The bit holder is positioned adjacent a distal end of the housing and is driven by rotation of the drive shaft. The rotary tool also includes a wrench assembly for adjusting the bit holder and a light source configured to emit light in a direction toward the bit holder. The wrench assembly is positioned adjacent the bit holder and is movable between a first position and a second position. The wrench assembly is coupled to the housing and disengaged from the bit holder assembly in the first position and is engaged with the bit holder assembly in the second position.

13 Claims, 9 Drawing Sheets

(56) References Cited

U.S. PATENT DOCUMENTS

| | | | |
|---|---|---|---|
| 6,350,087 | B1 | 2/2002 | Berry et al. |
| 6,648,567 | B2 | 11/2003 | Berry et al. |
| 7,264,429 | B2 | 9/2007 | Miller |
| 7,293,944 | B2 * | 11/2007 | Lui .................... B23B 31/2012 279/42 |
| 7,344,141 | B2 | 3/2008 | Schnell et al. |
| 7,980,325 | B2 | 7/2011 | Botefuhr et al. |
| 8,628,280 | B2 | 1/2014 | Ceroll et al. |
| 8,678,725 | B2 * | 3/2014 | Ceroll .................. B23B 45/006 279/42 |
| 9,144,846 | B2 | 9/2015 | Bernardi |
| 9,238,270 | B2 | 1/2016 | Ceroll et al. |
| 9,492,875 | B2 | 11/2016 | Ceroll et al. |
| 9,527,200 | B2 | 12/2016 | Okouchi et al. |
| 9,669,534 | B2 | 6/2017 | Okouchi et al. |
| 9,724,767 | B2 | 8/2017 | Ceroll et al. |
| 9,937,568 | B2 | 4/2018 | Ceroll et al. |
| 10,173,272 | B2 | 1/2019 | Ceroll et al. |
| 10,207,399 | B2 | 2/2019 | Okouchi et al. |
| 2012/0200048 | A1 | 8/2012 | Hilzinger et al. |
| 2020/0368892 | A1 | 11/2020 | Gaddis et al. |
| 2022/0009064 | A1 * | 1/2022 | Puzio ..................... H01F 38/14 |

FOREIGN PATENT DOCUMENTS

| | | |
|---|---|---|
| KR | 101955954 B1 | 3/2019 |
| WO | 2008115491 A1 | 9/2008 |
| WO | 2019034492 A1 | 2/2019 |

* cited by examiner

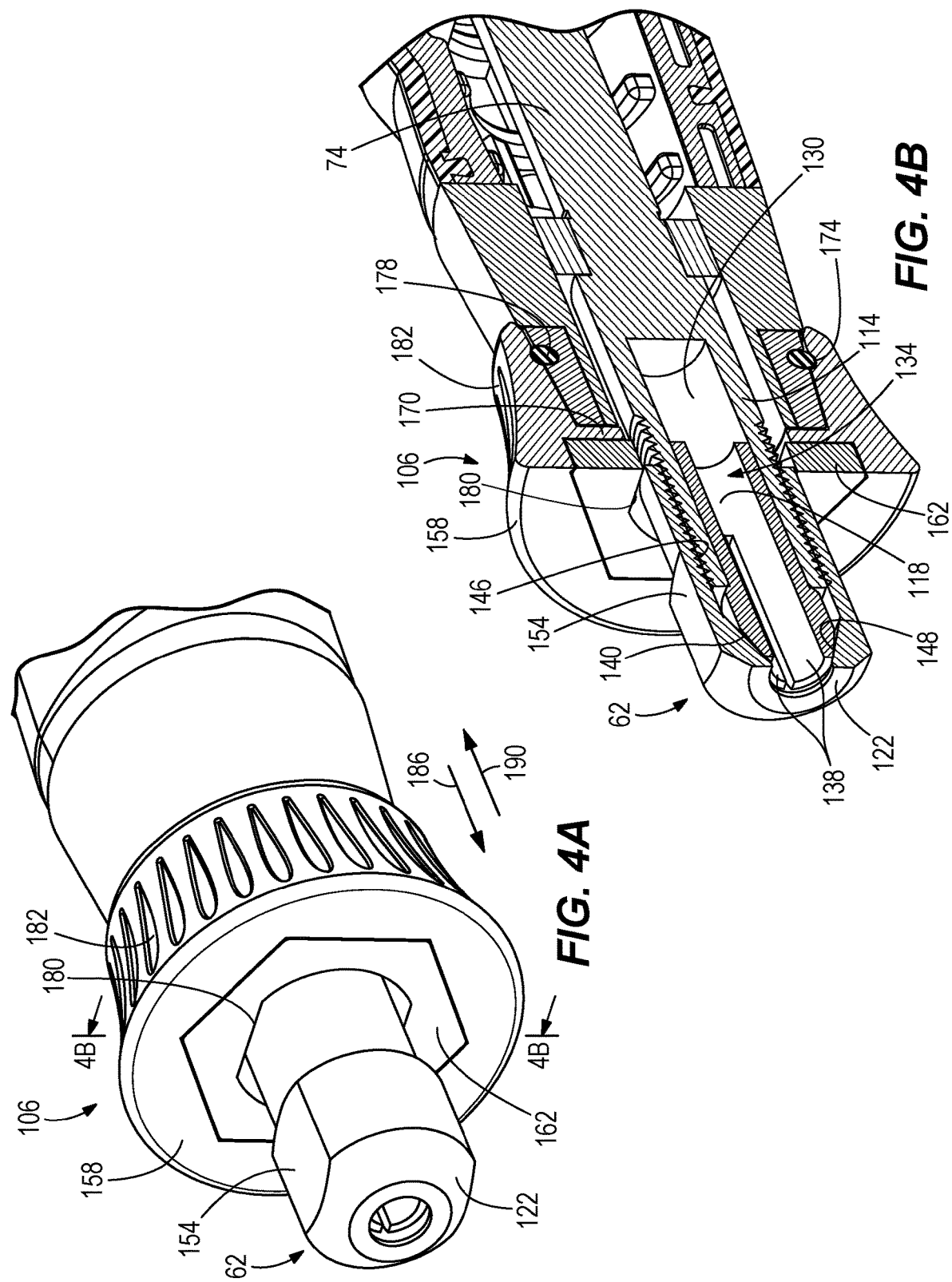

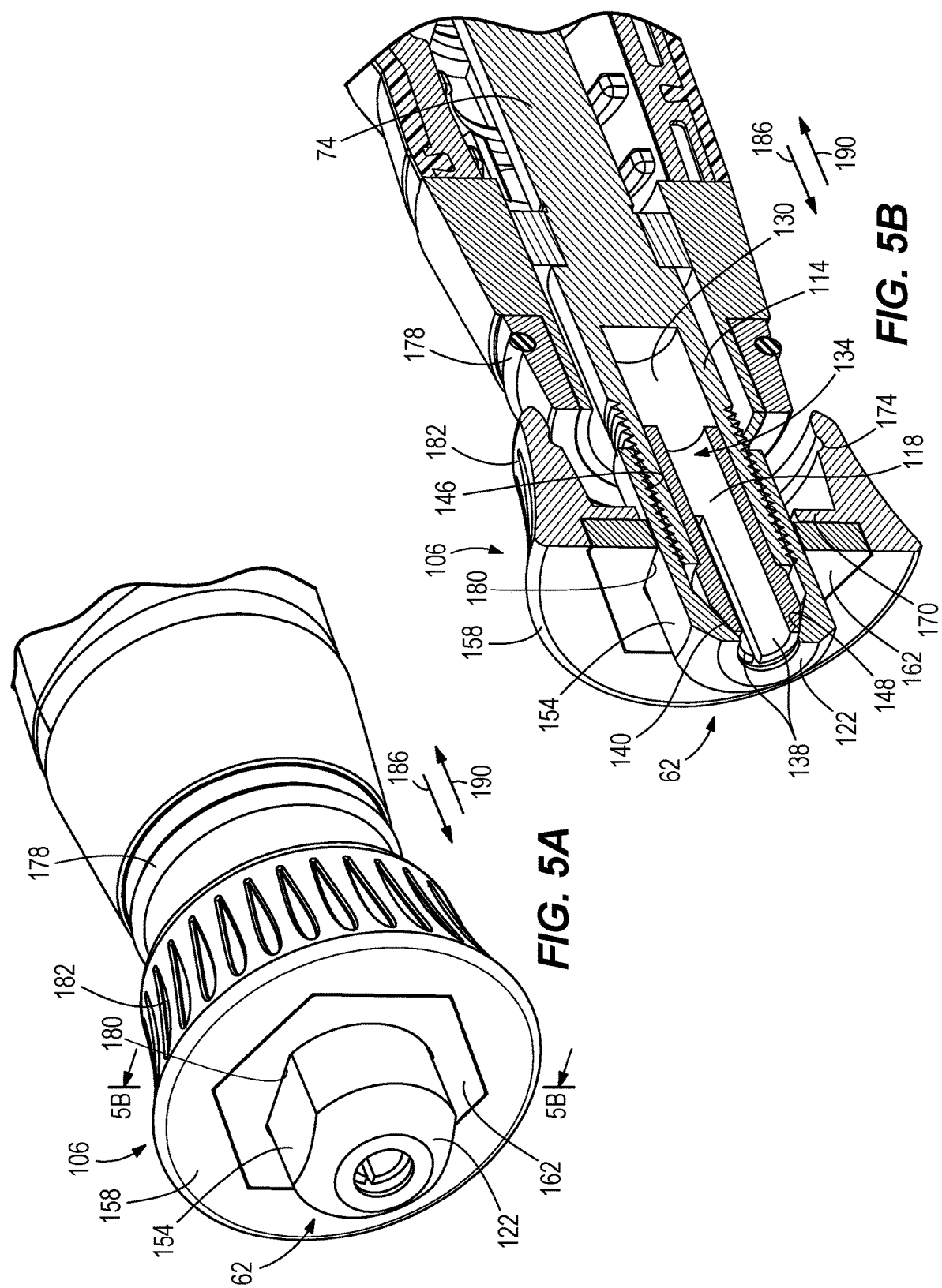

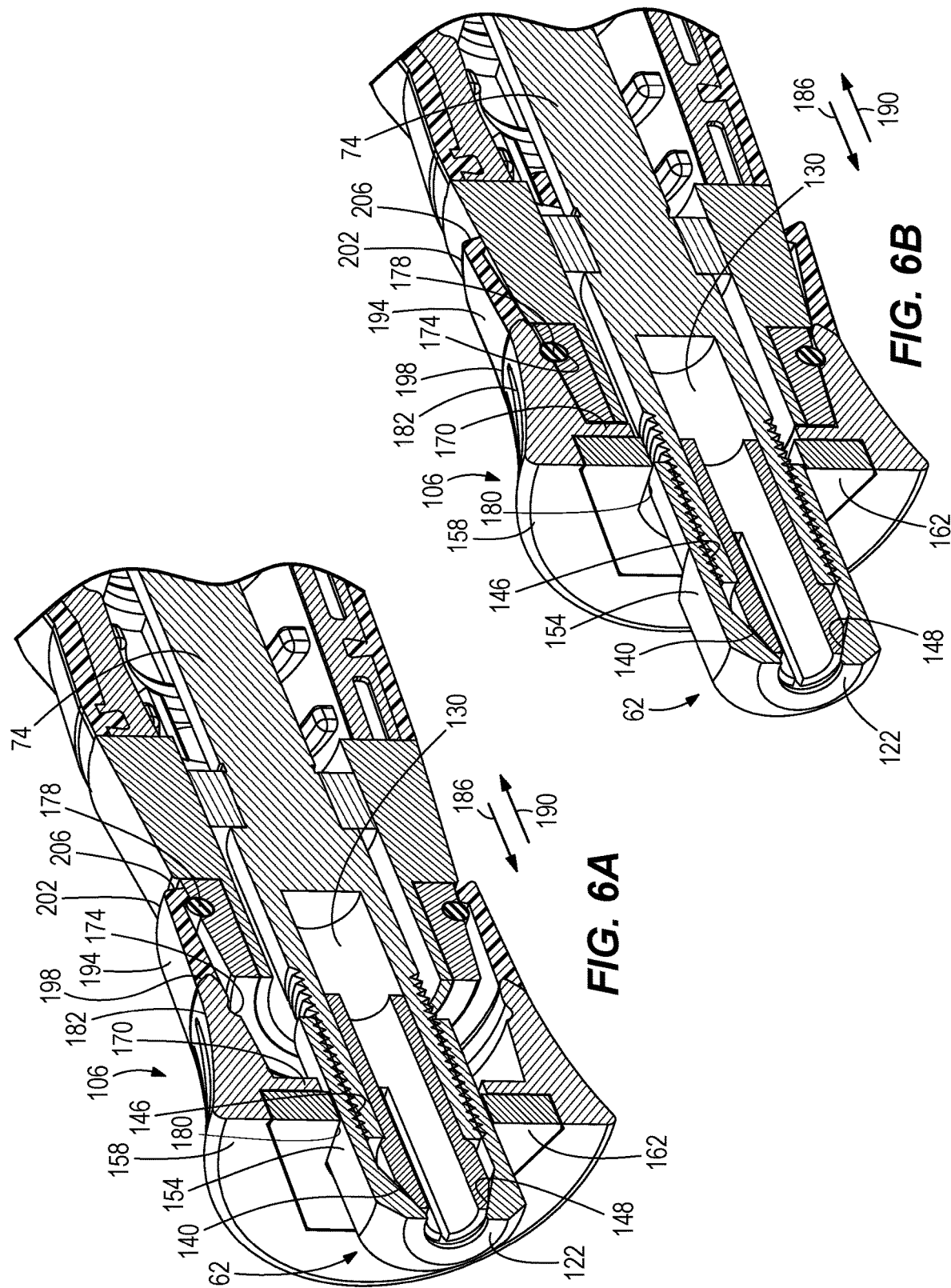

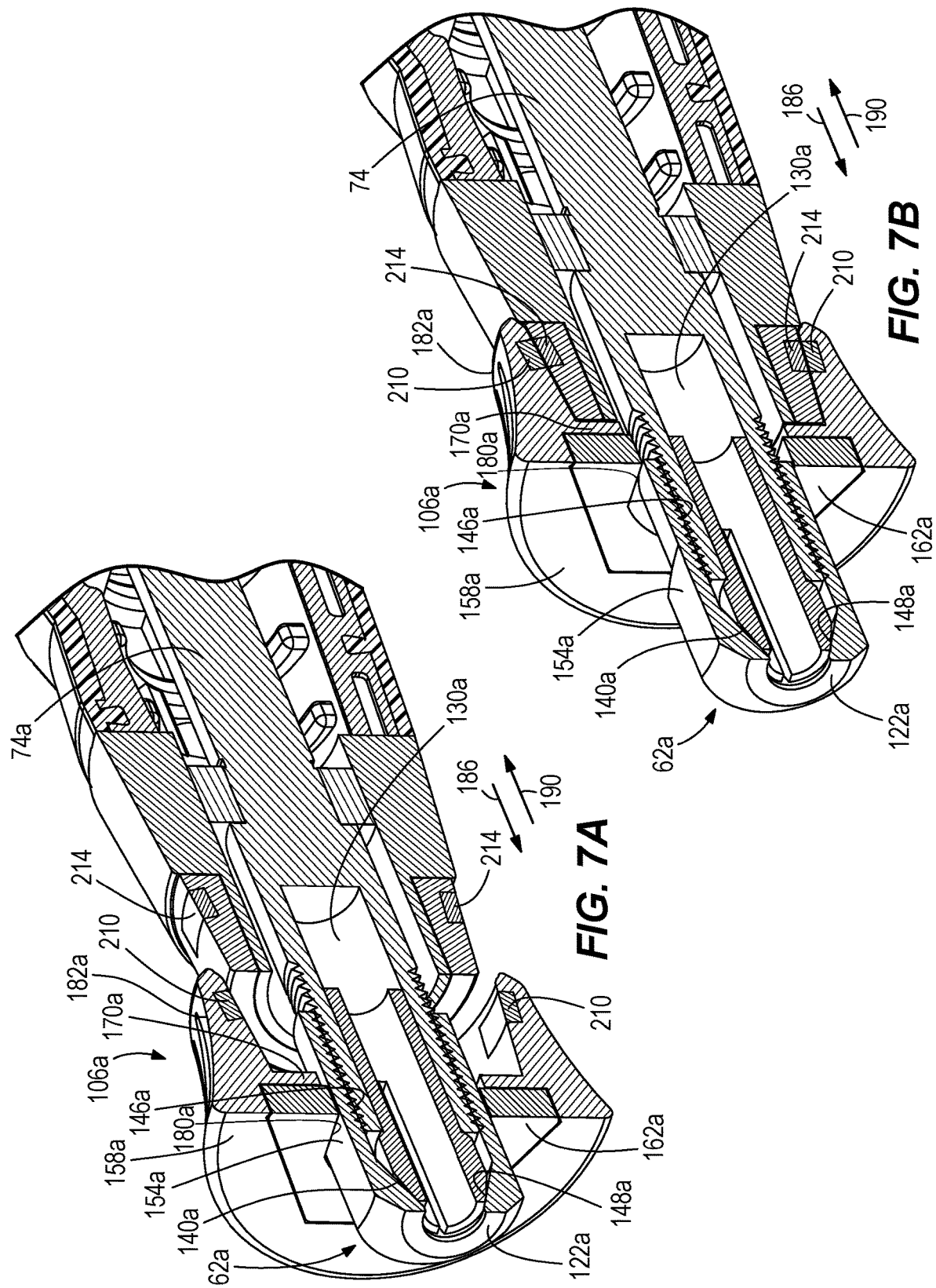

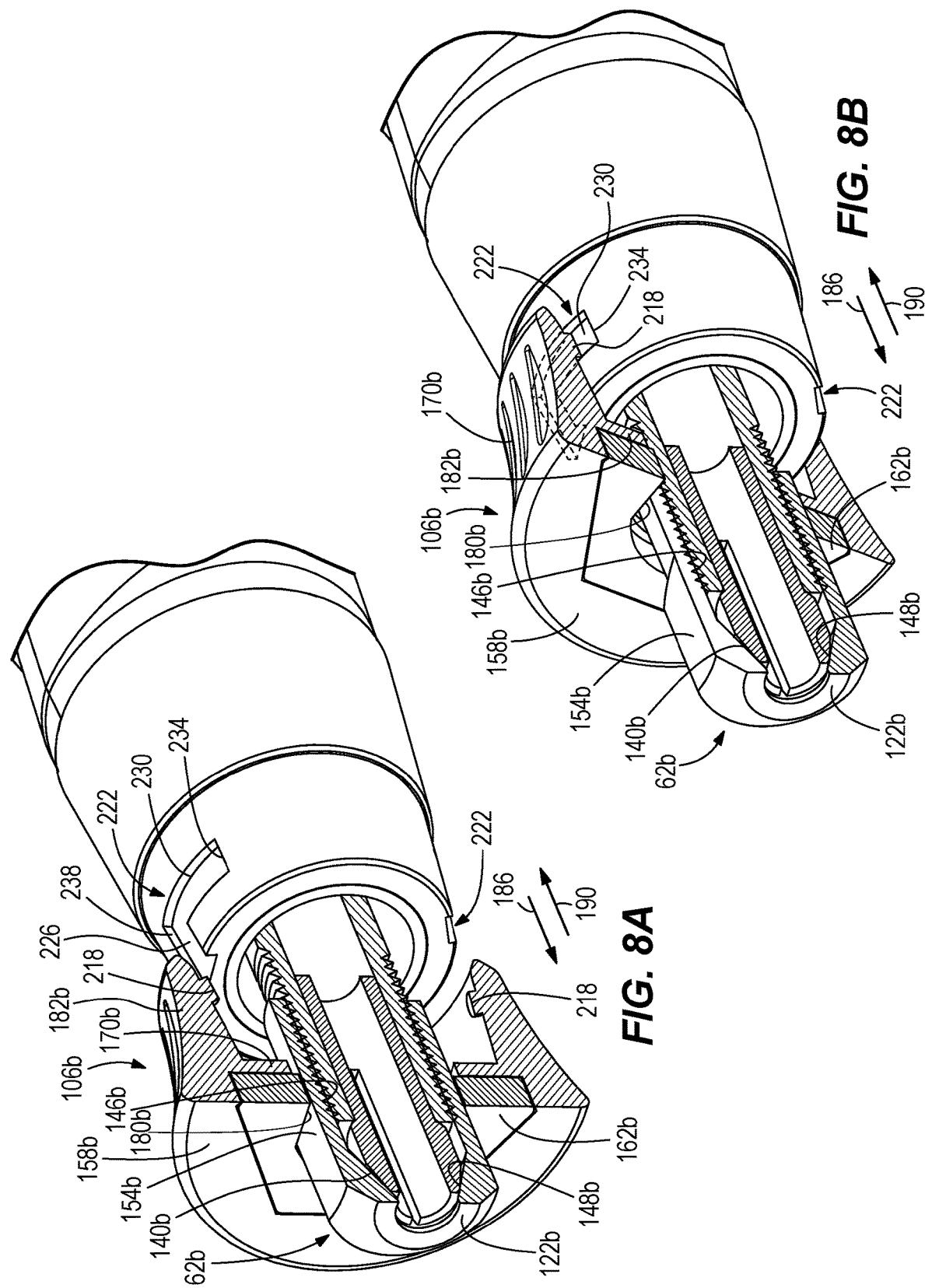

ROTARY TOOL

CROSS-REFERENCE TO RELATED APPLICATIONS

This application claims priority to U.S. Provisional Patent Application No. 62/962,444, filed on Jan. 17, 2020, the entire contents of which are incorporated by reference herein.

TECHNICAL FIELD

The present disclosure relates to rotary tools, and more particularly to rotary tools including a built-in wrench.

BACKGROUND

Rotary tools typically include a power supply, a handle, a motor positioned within the handle, and a bit holder. Rotary tools may accept a desired bit within the bit holder and may be used to perform cuts, sand or polish objects, and/or drill holes.

SUMMARY

In one aspect, a rotary tool includes a housing, a drive shaft positioned within the housing, a bit holder positioned adjacent a distal end of the housing and driven by rotation of the drive shaft, a wrench assembly for adjusting the bit holder, and a light source configured to emit light in a direction toward the bit holder. The wrench assembly is positioned adjacent the bit holder, and the wrench assembly is movable between a first position and a second position. The wrench assembly is coupled to the housing and disengaged from the bit holder assembly in the first position. The wrench assembly engages the bit holder assembly in the second position.

In another aspect, a rotary tool includes a housing including a first end, a second end opposite the first end, and a longitudinal axis extending between the first end and the second end. The rotary tool further includes a drive shaft positioned within the housing, a bit holder positioned adjacent the second end of the housing and driven by the drive shaft, and a wrench assembly selectively engageable with the bit holder. A groove is positioned on one of the housing and the wrench assembly, and a protrusion is positioned on the other of the housing and the wrench assembly. The protrusion engages the groove and retains the wrench assembly against axial movement while the wrench assembly is in a first position. The protrusion is axially spaced apart from the groove while the wrench assembly is in a second position.

In yet another aspect, a rotary tool assembly includes a base unit including a motor, a flexible member operatively connected to the motor, and a rotary tool. The rotary tool includes a housing, a drive shaft supported for rotation by the housing, the drive shaft driven by the flexible member, a bit holder assembly coupled to the drive shaft, and a wrench assembly for adjusting the bit holder assembly. The bit holder assembly includes a connection member connected to the drive shaft and defining a bore, a collet positioned within the bore, and a spindle threadably coupled to the connection member, movement of the spindle relative to the connection member adjusting an opening of the collet. The wrench assembly movable between a first position and a second position, the wrench assembly being coupled to the housing and disengaged from the bit holder assembly in the first position, the wrench assembly engaging the bit holder assembly in the second position.

Other features and aspects of the disclosure will become apparent by consideration of the following detailed description and accompanying drawings.

BRIEF DESCRIPTION OF THE DRAWINGS

FIG. 4A is a partial perspective view of the rotary tool of FIG. 2 in an engaged position.

FIG. 4B is a partial perspective cross-sectional view of the rotary tool of FIG. 2 in the engaged position.

FIG. 5A is a partial perspective view of the rotary tool of FIG. 2 in a disengaged position.

FIG. 5B is a partial perspective cross-sectional view of the rotary tool of FIG. 2 in the disengaged position.

FIG. 6A is a partial perspective cross-sectional view of the rotary tool of FIG. 2 in the disengaged position, including an extension sleeve.

FIG. 6B is a partial perspective cross-sectional view of the rotary tool of FIG. 2 in the engaged position, including the extension sleeve of FIG. 6A.

FIG. 7A is a partial perspective cross-sectional view of a rotary tool according to another embodiment, in a disengaged position.

FIG. 7B is a partial perspective cross-sectional view of the rotary tool of FIG. 7A in an engaged position.

FIG. 8A is a partial perspective cross-sectional view of a rotary tool according to yet another embodiment, in a disengaged position.

FIG. 8B is a partial perspective cross-sectional view of the rotary tool of FIG. 8A in an engaged position.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

Figure 1:
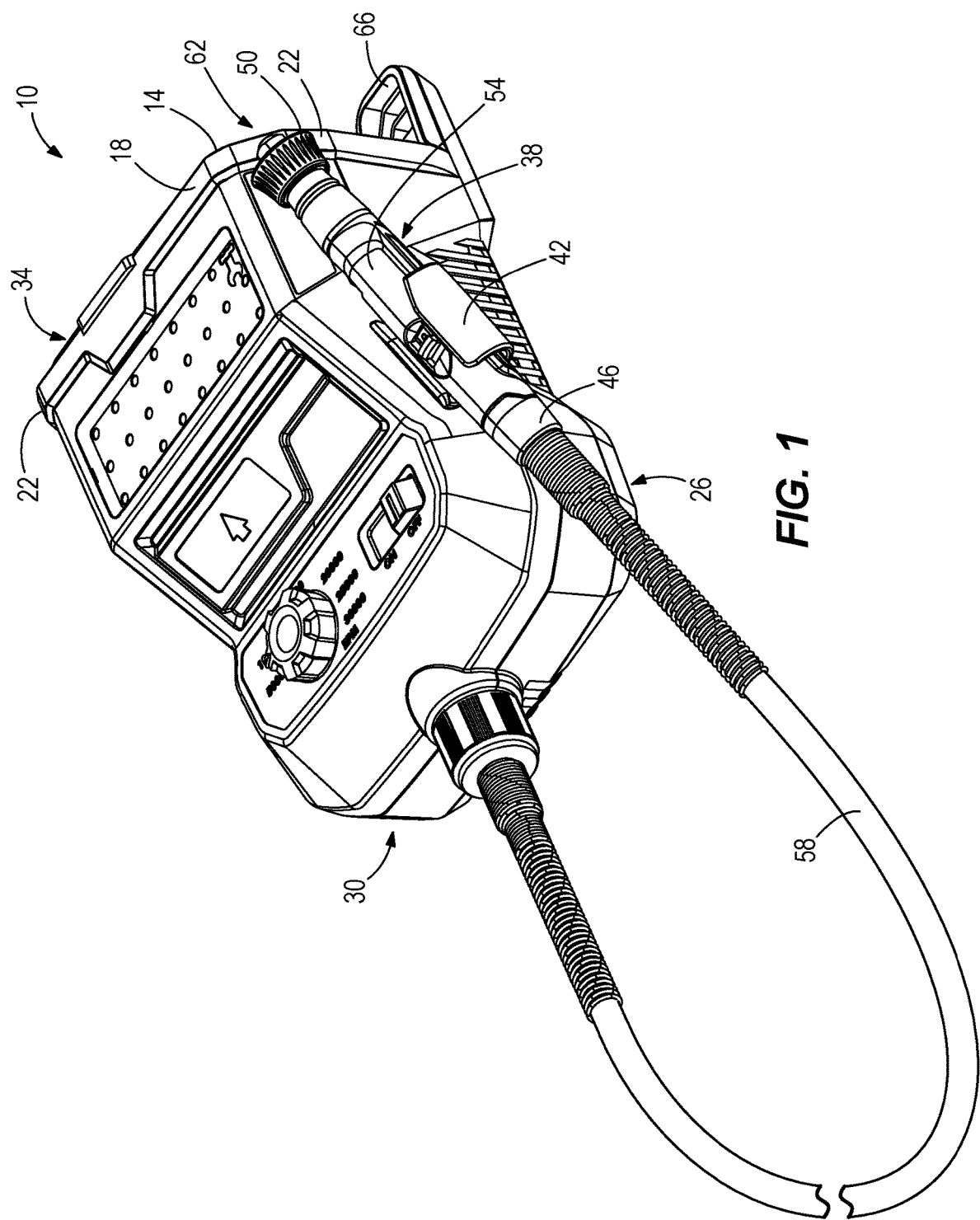
FIG. 1 is a perspective view of a rotary tool assembly according to one embodiment of the disclosure.
Figure 2:
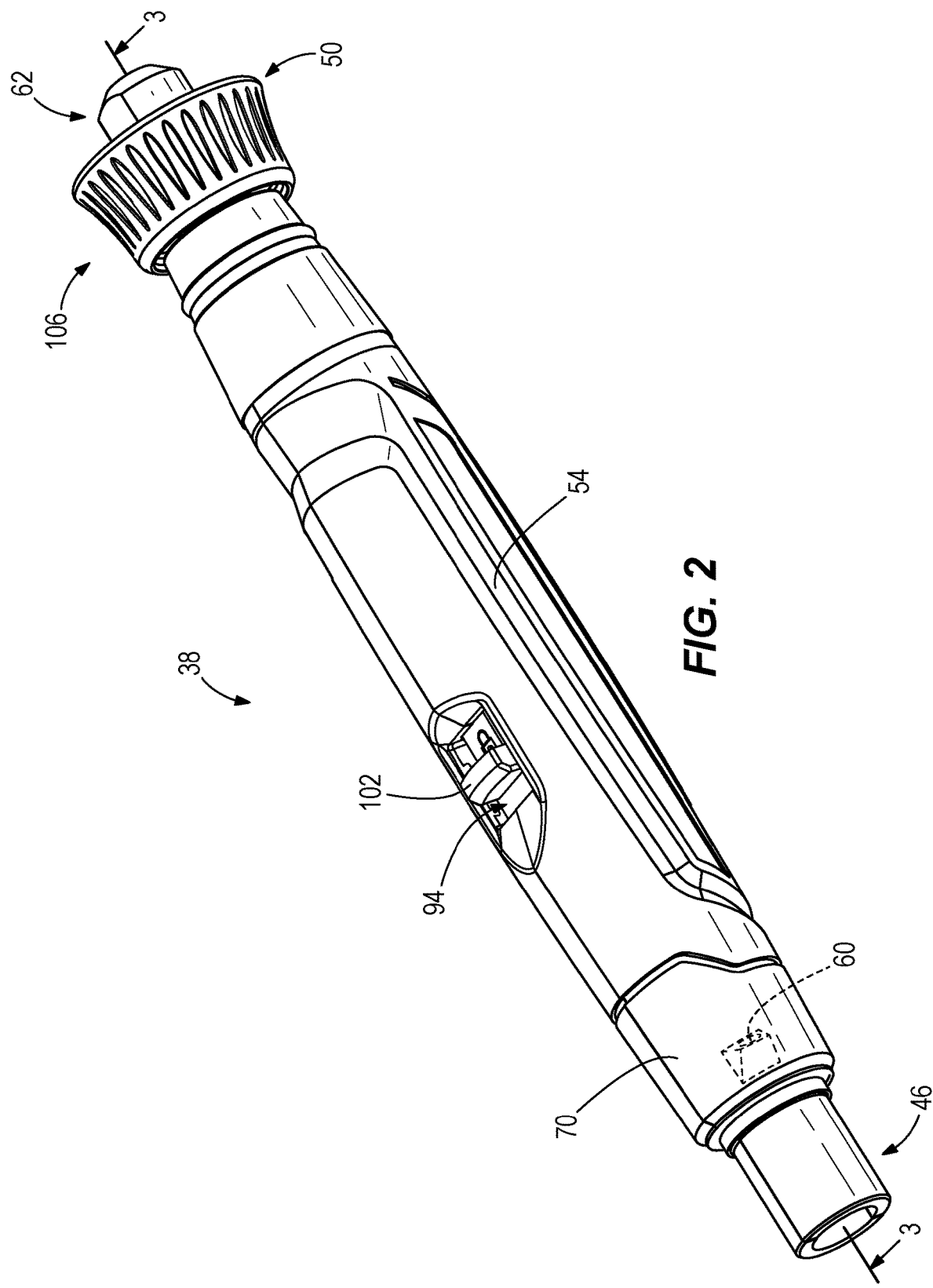
FIG. 2 is a perspective view of a rotary tool of the rotary tool assembly of FIG. 1.

FIG. 1 illustrates a rotary tool assembly 10 according to one embodiment. The rotary tool assembly 10 may include a main body 14 having a top portion 18, a side portions 22, a bottom portion 26, a front portion 30, and a rear portion 34. A rotary tool portion, such as a rotary tool 38 (FIG. 2), may be removably attached to a docking portion 42 that extends from one of the side portions 22 of the main body 14. In the illustrated embodiment, the docking portion 42 is positioned at an angle with respect to the main body 14. The docking portion 42 may include a C-shaped structure, which engages with the rotary tool 38. In other embodiments, the docking portion 42 may be positioned on any surface of the main body 14 and comprise any suitable structure for facilitating the attachment and removal of the rotary tool 38 from the main body 14.

The rotary tool 38 may include a first end 46, a second end 50, and a handle 54 extending between the first end 46 and the second end 50. The first end 46 of the rotary tool 38 may be connected to a flexible member 58 that extends between portions of the rotary tool 38 and portions of the rotary tool assembly 10. The flexible member 58 may comprise a flexible conduit, cord, and/or the like. The flexible member 58 may extend from the front portion 30 of the main body 14 to the first end 46 of the rotary tool 38, in some embodiments. The flexible member 58, or a portion thereof, may be operably connected (e.g. electrically connected, physically connected, and/or the like) to a motor (not shown) positioned within the main body 14 of the rotary tool assembly 10. The flexible member 58 is optional, in some embodiments, as the rotary tool 38 may be provided as an entirely handheld unit with a motor and/or battery disposed inside the handle 54.

In some embodiments, of the rotary tool 38 may additionally include a light source (e.g., a light emitting diode) 60 emitting light in a direction toward the second end 50 to illuminate a work surface during use. In the illustrated embodiment, the light source 60 is positioned adjacent the first end 46. In some embodiments, the tool 38 may include a transparent region and the light source may be piped through the transparent region during use. In some embodiments, the light source may be disposed on an outer portion of the tool 38.

The second end 50 of the rotary tool 38 may include a bit holder assembly 62. The bit holder assembly 62 may removably accept any one of a variety of bits (not shown), and retain the bit during use of the rotary tool assembly 10. Portions of the bit holder assembly 62 may be caused to rotate and, thus, rotate the bit disposed therein for performing an operation (e.g., a clearing operation, a cutting operation, a grinding operation, and/or the like). The bit holder assembly 62 may be caused to rotate by the motor, to which the bit holder assembly 62 is operatively connected by way of connection to the flexible member 58 in some embodiments.

A battery (not shown) may be removably attached to a battery connection portion 66 (e.g., a receptacle) positioned on the main body 14. The battery is a power source that may be operably connected to the motor for providing power thereto. In some embodiments, the battery may include one or more battery cells. For example, the battery pack may be a 12-volt battery pack and may include three (3) Lithium-ion battery cells. In other embodiments, the battery pack may include fewer or more battery cells such that the battery pack is a 14.4-volt battery pack, an 18-volt battery pack, or the like. Additionally, or alternatively, the battery cells may have chemistries other than Lithium-ion such as, for example, Nickel Cadmium, Nickel Metal-Hydride, or the like. Additionally, or alternatively, the rotary tool assembly may use a power source such as a cord providing an alternating current power supply, e.g., from a utility source such as a standard outlet, and may include a transformer as necessary.

Figure 3:
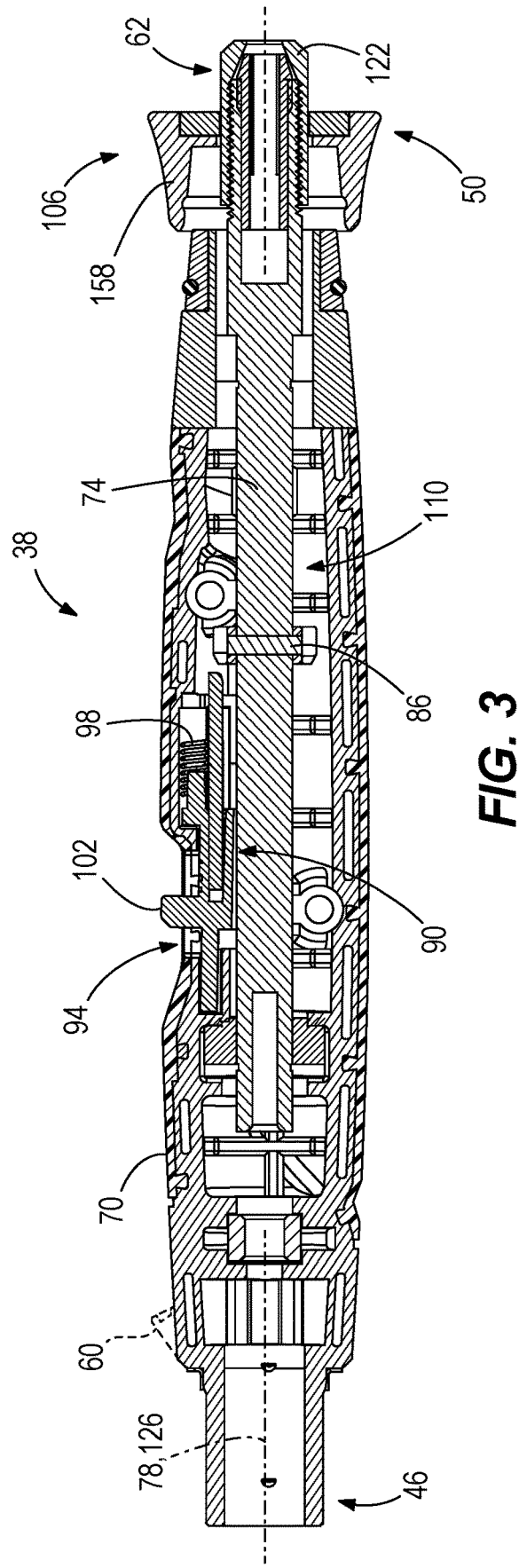
FIG. 3 is a cross-sectional side view of the rotary tool of FIG. 2.

FIG. 3 illustrates the internal components of the rotary tool 38. The rotary tool 38 may include a housing 70 and a drive shaft, or spindle, 74 positioned within the housing 70. The drive shaft 74 defines a longitudinal axis 78 and is rotatably connected to a shaft disposed in the flexible member 58 that causes rotation of the drive shaft 74. The rotary tool 38 may additionally include a locking structure 86 positioned on, over, and/or around the drive shaft 74, and a drive shaft lock switch assembly 90 at least partially positioned in a recess 94 of the housing 70. The drive shaft lock switch assembly 90, or a portion thereof, is configured to engage or disengage from the locking structure 86 of the drive shaft 74 for causing the drive shaft 74 to respectively lock (e.g., not rotate) or unlock (e.g., rotate). In this way, the drive shaft 74 may be locked, for example, when a collet is being released or clamped respective to the bit holder assembly 62 and/or a bit is being inserted or removed respective to the bit holder assembly 62.

The drive shaft 74 may be connected to the bit holder assembly 62 and rotates a bit disposed in the bit holder assembly 62. The drive shaft lock switch assembly 90 may be slidably movable relative to the housing 70 to engage with the locking structure 86 and to prevent rotation of the drive shaft 74. A biasing member 98 (e.g., a spring) may be disposed on or over the drive shaft lock switch assembly 90, or a portion thereof, for biasing a slidable switch member 102 of the drive shaft lock switch assembly 90 towards an unlocked position, which in turn allows rotation of the drive shaft 74.

As shown in FIGS. 3-5B, the rotary tool 38 includes a wrench assembly 106 movably coupled to one end (e.g., the second end 50) of the rotary tool 38. The housing 70 defines a cavity 110 in which the drive shaft 74 and the bit holder assembly 62 are at least partially positioned. The bit holder assembly 62 extends from the second end 50 of the tool 38 and includes a connection member 114, a collet 118, and a spindle 122.

The connection member 114 is connected (e.g., integrally formed) to and configured to rotate with the drive shaft 74. The connection member 114 defines an axis of rotation 126 (FIG. 3) that is coaxial with the longitudinal axis 78. The connection member 114 includes a bore 130 configured to receive at least a portion of the collet 118. An outer surface of the connection member 114 may be threaded such that the connection member 114 may be threadably coupled to the spindle 122.

With reference to FIGS. 4A-5B, the collet 118 may be substantially cylindrical and include an aperture 134 extending therethrough which is configured to receive a bit. The collet 118 may include at least two arms 138, each having a substantially beveled surface 140. The arms 138 of the collet 118 may be tightened or loosened respective to a bit by way of rotating the spindle 122.

In some embodiments, the spindle 122 is threadably coupled to the connection member 114. For example, the spindle 122 may be substantially cylindrical and includes a threaded aperture 146, which threadably engages the outer surface of the connection member 114. The spindle 122 may be rotatably movable relative to the connection member 114 between a first, clamped position, and a second, unclamped position. A distal end of the spindle 122 may include a beveled surface 148 that aligns with the beveled surface 140 of the collet arms 138. When the spindle 122 is in the first position, the beveled surface 148 of the spindle 122 may contact the beveled surface 140 of the collet 118, moving the collet arms 138 radially inward to apply a clamping force on a bit. Alternatively, when the spindle 122 is in the second position, the bit is unclamped or unrestrained and movable within the aperture 134 of the collet 118. An outer surface of spindle 122 may include two, diametrically-spaced flat surfaces 154. The flat surfaces 154 may facilitate rotation of the spindle 122 relative to the connection member 114. In some embodiments, the outer surface of the spindle 122 may include more or fewer than two flat surfaces 154. In some embodiments, the flat surfaces 154 may include alternative configurations (e.g., ridges, grooves, non-flat surfaces).

The wrench assembly 106 includes a collar 158 and an engaging member 162. The collar 158 is generally cylindrical and includes an aperture 166 extending therethrough. An inner surface of the collar 158 includes a shoulder 170 extending radially inward and is engageable with the engaging member 162. The inner surface of the collar 158 additionally includes a groove 174 engagable with a corresponding ridge, or protrusion, 178 on the second end 50 of the tool 38. An outer surface of the collar 158 defines a grip portion 182 graspable by a user. The engaging member 162 may be fixed within the collar 158. For example, the engaging member 162 may be seated within the collar 158 and abutted against the shoulder 170. The engaging member 162 includes a hexagonal outer periphery and an inner periphery corresponding to the outer surface of the spindle 122.

With reference to FIGS. 4A-5B, the wrench assembly 106 is movable between an engaged position (FIGS. 4A-4B) and a disengaged position (FIGS. 5A-5B) relative to the housing 70. In the engaged position, the collar 158 of the wrench assembly 106 may engage the second end 50 of the tool 38 and the engaging member 162 may disengage from the spindle 122 so as to not interfere with rotation of the spindle 122. For example, the groove 174 positioned on the inner surface of the collar 158 may engage the ridge 178 on the second end 50 of the tool 38, thereby maintaining the wrench assembly 106 in the engaged position. In the disengaged position, the collar 158 may disengage the second end 50 of the tool 38 and the engaging member 162 may be engaged with the spindle 122, allowing the collet to be tightened or untightened by way of rotating the collar 158. In some implementations, the flat surfaces 180 on the engaging member 162 are aligned with and engage with the flat surfaces 154 on the spindle 122 to facilitate loosening or tightening the collet 118 upon rotation of the engaging member 162.

In some embodiments (FIGS. 6A-6B), the collar 158 includes an extension 194. For example, the extension 194 may extend from and be integrally formed with a distal end 198 of the collar 158. A distal end 202 of the extension 194 may include a lip 206 positioned on an inner surface of the extension 194. The lip 206 may be engageable with the ridge 178 on the second end 50 of the tool 38. While the wrench assembly 106 is in the disengaged position (FIG. 6A), the lip 206 engages the ridge 178 to retain the collar 158 on the housing 70. Stated another way, the lip 206 is configured to inhibit the collar 158, and therefore the wrench assembly 106, from being removed from tool 38.

In order to move the wrench assembly 106 from the engaged position (FIGS. 4A-4B) to the disengaged position (FIGS. 5A-5B), the user can engage the grip portion 182 of the collar 158 and exert a force to axially move the collar 158 in a first direction 186. The wrench assembly 106 may slide along the longitudinal axis 78 until the engaging member 162 engages the spindle 122. Once the engaging member 162 is aligned with the outer surface of the spindle 122, the collar 158 may be rotated in a first rotational direction (e.g., counterclockwise), causing corresponding rotation of the spindle 122 relative to the connection member 114 via the threaded portions. The spindle 122 releases the collet 118, which subsequently relaxes and/or minimizes the compressive force exerted on the bit, allowing the bit to be removed from the bit holder assembly 62.

Alternatively, in order to move the wrench assembly 106 from the disengaged position (FIGS. 5A-5B) to the engaged position (FIGS. 4A-4B), a bit may be positioned within the collet 118 and the collar 158 may be rotated in a second rotational direction (e.g., clockwise), causing corresponding rotation and tightening of the spindle 122 onto the connection portion 114 via the threaded portions. The collar 158 may move axially in a second direction 190, causing the engaging member 162 to disengage the spindle 122. The wrench assembly 106 slides along the longitudinal axis 78 until the groove 174 on the inner surface of the collar 158 engages the ridge 178 on the second end 50 of the tool 38, seating the wrench assembly 106 on or over the housing 70.

FIGS. 7A-9B illustrate rotary tools in which a collar is coupled to a housing in a different manner than the collar 158 described above with respect to FIGS. 1-5B. Otherwise, the illustrated rotary tools are similar to the rotary tool 38 described above and include similar features. Reference is hereby made to the description of the rotary tool 38 shown in FIGS. 1-5B for description of the features and elements of the rotary tools not specifically included below.

FIGS. 7A-7B illustrate rotary tool 38a. The rotary tool 38a is similar to the rotary tool 38, and similar features are identified with similar reference numbers, appended with the letter "a."

As shown in FIGS. 7A-7B, a wrench assembly 106a includes a collar 158a and an engaging member 162a. An inner surface of the collar 158a includes one or more magnets (e.g., referred to as first magnets) 210 engageable with corresponding magnets (e.g., referred to as two other magnets, or two second magnets) 214 on a second end 50a of the tool 38a. In the illustrated embodiment, the collar 158a includes two first magnets 210 positioned on opposite sides of the inner surface of the collar 158a, and two second magnets 214 positioned on opposite sides of the end 50a of the tool 38a, such that each of the first magnets 210 aligns with an associated one of the second magnets 214. In the engaged position, the collar 158a of the wrench assembly 106a engages the second end 50a of the tool 38a, and the engaging member 162a is disengaged from the spindle 122a to avoid interference with rotation of the spindle 122a. In this position, the first magnets 210 engage the second magnets 214, thereby maintaining the wrench assembly 106a in the engaged position.

In order to move the wrench assembly 106a from the engaged position to the disengaged position, the user can engage grip portion 182a of the collar 158a and exert a force to overcome the attraction of the magnets 210, 214, thereby moving the collar 158a in a first direction 186a. The wrench assembly 106a may slide along a longitudinal axis 78a until the engaging member 162a engages spindle 122a, thereby separating the first magnets 210 from the second magnet 214.

In order to move the wrench assembly 106a from the disengaged position to the engaged position, a bit is positioned within collet 118a and the collar 158a is rotated in the second rotational direction, causing corresponding rotation and tightening of the spindle 122a onto the connection portion 114a via the threaded portions. A force is exerted on the collar 158s to axially move the collar 158a in the second direction 190a, causing the engaging member 162a to disengage the spindle 122a. The wrench assembly 106a slides parallel to the longitudinal axis 78a, and the wrench assembly 106a is rotated relative to the tool 38a until the first magnets 210 align with and engage the second magnets 214, thereby securing the wrench assembly 106a on or over the housing 70a.

FIGS. 8A-8B illustrate rotary tool 38b. The rotary tool 38b is similar to rotary tool 38, and similar features are identified with similar reference numbers, appended with the letter "b."

As shown in FIGS. 8A-8B, a wrench assembly 106b includes a collar 158b and an engaging member 162b. An inner surface of the collar 158b includes one or more keys 218 engagable with corresponding slots 222 on a second end 50b of the tool 38b. In the illustrated embodiment, the collar 158b includes two keys 218 positioned on opposite sides of the inner surface of the collar 158b, and two slots 222 positioned on opposite sides of the end 50 of the tool 38b, such that each of the keys 218 engages an associated one of the slots 222. The slots 222 may be generally L-shaped and are shaped and sized to receive the keys 218 when the wrench assembly 106b is properly aligned with the second end 50b of the tool 38b. For example, each of the keys 218 may include a first portion 226, and a second portion 230 oriented perpendicular to the first portion 226. When the key 218 is seated within the first portion 226 of the slot 222, the wrench assembly 106b is permitted to axially move relative to the tool 38b but is restricted from rotating relative to the tool 38b. Alternatively, when the key 218 is seated within the second portion 230 of the slot 222, the wrench assembly 106b is permitted to rotate relative to the tool 38b but is restricted from moving in an axial direction relative to the tool 38b.

In the engaged position, the collar 158b of the wrench assembly 106b engages the second end 50b of the tool 38b, and the engaging member 162b is disengaged from the spindle 122b to avoid interference with rotation of the spindle 122b. In this position, the keys 218 are seated within the second portion 230 of the slots 222 on the second end 50b of the tool 38b, thereby maintaining the wrench assembly 106b in the engaged position.

In order to move the wrench assembly 106b from the engaged position to the disengaged position, the user may engage the grip portion 182b of the collar 158b and rotates the collar 158b in the first rotational direction. The keys 218 slide along the second portion 230 of the slots 222 from a first end 234 of the second portion 230 to a second end 238 of the second portion 230. Once the keys 218 engage the second end 238 of the second portion 230 of the slots 222, the collar 158b is moved axially in the first direction 186b. The wrench assembly 106b slides along the longitudinal axis 78b, and the keys 218 slide along the first portion 226 of the slots 222, until the engaging member 162b engages the spindle 122b and the keys 218 disengage the slots 222. Once the engaging member 162b is aligned with the outer surface of the spindle 122b, the collar 158b can be rotated in the first rotational direction, causing corresponding rotation of the spindle 122b relative to the connection member 114b via the threaded portions. The spindle 122b releases the collet 118b, which subsequently releases the force exerted on the bit, allowing for the bit to be removed from the bit holder assembly 62b.

In order to move the wrench assembly 106b from the disengaged position to the engaged position, a bit is positioned within the collet 118b and the collar 158b is rotated in the second rotational direction, causing corresponding rotation and tightening of the spindle 122b onto the connection portion 114b via the threaded portions. The collar 158b is moved axially in a second direction 190b, causing the engaging member 162b to disengage the spindle 122b. The wrench assembly 106b slides along the longitudinal axis 78b, and the wrench assembly 106b may be rotated relative to the tool 38b until the keys 218 align with the slots 222. Once the keys 218 engage the slots 22, the keys 218 slide along the first portion 226 of the slots 222 until the keys 218 abut against the second end 238 of the second portion 230 of the slots 222. The collar 158b is then rotated in the second rotational direction, causing the keys 218 to slide along the second portion 230 of the slots 222 until the keys 218 engage the first end 234 of the second portion 230 of the slots 222. The wrench assembly 106b is therefore seated on the housing 70b and prevented from axially moving relative to the tool 38b.

Figures 9A, 9B:
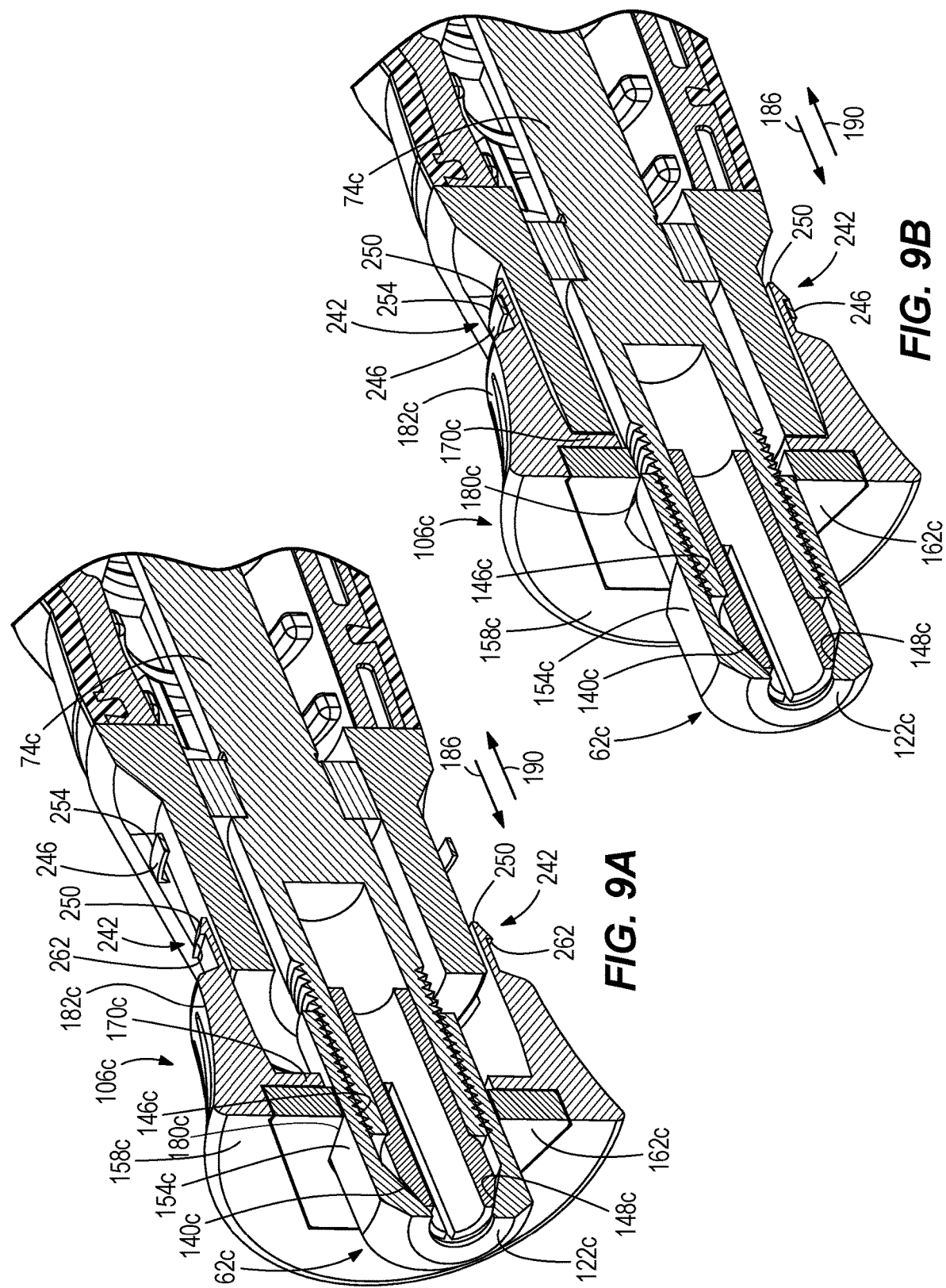
FIG. 9A is a partial perspective cross-sectional view of a rotary tool according to still another embodiment, in a disengaged position.
FIG. 9B is a partial perspective cross-sectional view of the rotary tool of FIG. 9A in an engaged position.

FIGS. 9A-9B illustrate rotary tool 38c. The rotary tool 38c is similar to rotary tool 38, and similar features are identified with similar reference numbers, appended with the letter "c."

As shown in FIGS. 9A-9B, a wrench assembly 106c includes a collar 158c and an engaging member 162c. An inner surface of the collar 158c includes tabs 242 engageable with corresponding flanges 246 on the second end 50c of the tool 38c. In the illustrated embodiment, the collar 158c includes two tabs 242 positioned on opposite sides of the inner surface of the collar 158c, and two flanges 246 positioned on opposite sides of the end 50c of the tool 38c, such that each of the tabs 242 aligns with an associated one of the flanges 246. A lip 250 protrudes from a distal end of each of the tabs 242 and is engageable with an edge 254 of the flanges 246 to maintain the wrench assembly 106c against the tool 38c. For example, the distal end of each tab 242 may be generally slanted and forms a ledge 262. The lips 250 may slide relative to the flanges 246 in the first direction 186c until the ledges 262 abut against the edge 254 of the flanges 246, thereby locking the tabs 242 against the flanges 246 in the engaged position. In the engaged position, the collar 158c of the wrench assembly 106c engages the second end 50c of the tool 38c, and the engaging member 162c is disengaged from spindle 122c to avoid interference with rotation of the spindle 122c.

In order to move the wrench assembly 106c from the engaged position to the disengaged position, the user may engage the grip portion 182c of the collar 158c and compress or pinch the grip portion 182c, thereby causing the tabs 242 to move toward the tool 38c (e.g., inwardly) and allowing the lips 250 to disengage the edge 254 of the flanges 246. While maintaining the pinching force on the grip portion 182c, the collar 158c may move axially in the first direction 186c such that the wrench assembly 106c slides along the longitudinal axis 78c. Once the engaging member 162c is aligned with the outer surface of the spindle 122c, the collar 158c can be rotated in the first rotational direction, causing corresponding rotation of the spindle 122c relative to the connection member 114c via the threaded portions. The spindle 122c releases the collet 118c, which subsequently releases the force exerted on the bit, allowing for the bit to be removed from the bit holder assembly 62c.

In order to move the wrench assembly 106c from the disengaged position to the engaged position, a bit is positioned within the collet 118c and the collar 158c is rotated in the second rotational direction, causing corresponding rotation and tightening of the spindle 122c onto the connection portion 114b via the threaded portions. The collar 158c is moved axially in a second direction 190c, causing the engaging member 162c to disengage the spindle 122c. The wrench assembly 106c slides along the longitudinal axis 78c, and the wrench assembly 106c may be rotated relative to the tool 38c until the tabs 242 align with and engage the edge 254 of the flanges 246, thereby locking the wrench assembly 106c against the tool 38c.

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A rotary tool comprising:
a housing defining a longitudinal axis;
a drive shaft positioned within the housing;
a bit holder positioned adjacent a distal end of the housing and driven by rotation of the drive shaft;
a wrench assembly for adjusting the bit holder, the wrench assembly positioned adjacent the bit holder, the wrench assembly being axially movable along the longitudinal axis, between a first position and a second position, the wrench assembly being coupled to the housing and disengaged from the bit holder assembly in the first position, the wrench assembly engaging the bit holder assembly in the second position, and wherein the wrench assembly includes one magnet, and the housing includes another magnet engageable with the one magnet to retain the wrench assembly in the first position; and
a light source configured to emit light in a direction toward the bit holder.

2. The rotary tool of claim 1, wherein the bit holder includes a connection member connected to the drive shaft and defining a bore, a collet positioned within the bore, and a spindle threadably coupled to the connection member.

3. The rotary tool of claim 2, wherein movement of the spindle relative to the connection member adjusts an opening of the collet.

4. The rotary tool of claim 3, wherein the spindle includes a first beveled surface and the collet includes a second beveled surface engageable with the first beveled surface, wherein movement of the spindle causes movement of the second beveled surface along the first beveled surface to adjust the opening of the collet.

5. The rotary tool of claim 1, wherein the light source is supported on an outer surface of the housing and oriented toward the bit holder.

6. The rotary tool of claim 1, wherein the light source is positioned within the housing.

7. The rotary tool of claim 1, wherein one of the wrench assembly and the housing includes a groove, and the other of the wrench assembly and the housing includes a protrusion engageable with the groove to retain the wrench assembly in the first position.

8. The rotary tool of claim 1, wherein the wrench assembly includes a key, and the housing includes a slot engageable with the key to retain the wrench assembly in the first position.

9. The rotary tool of claim 8, wherein the key is axially movable relative to the housing along a first portion of the slot and is rotatable relative to the housing along a second portion of the slot.

10. The rotary tool of claim 1, wherein the wrench assembly includes a tab, and the housing includes a flange engageable with the tab to retain the wrench assembly in the first position.

11. The rotary tool of claim 1, wherein the wrench assembly includes a collar and an engaging member positioned within the collar, the engaging member being spaced apart from the bit holder while the wrench assembly is in the first position.

12. The rotary tool of claim 11, further comprising a shoulder extending radially inward from an inner surface of the collar, wherein the shoulder is engageable with the engaging member.

13. The rotary tool of claim 1, further comprising a locking structure positioned on the drive shaft, and a lock assembly engaging the locking structure to prevent the drive shaft from rotating.

* * * * *